ELECTRICAL CONNECTOR

Original Filed Dec. 23, 1946 3 Sheets-Sheet 1

INVENTOR.
James C. Macy

BY

Blair, Curtis & Hayward
ATTORNEYS

ELECTRICAL CONNECTOR

Original Filed Dec. 23, 1946 3 Sheets-Sheet 2

INVENTOR.
James C. Macy
BY
Blair, Curtis & Hayward
ATTORNEYS

ELECTRICAL CONNECTOR

Original Filed Dec. 23, 1946 3 Sheets-Sheet 3

INVENTOR.
James C. Macy

BY

Blair, Curtis & Hayward
ATTORNEYS

United States Patent Office

Re. 24,510
Reissued Aug. 5, 1958

24,510

ELECTRICAL CONNECTOR

James C. Macy, Westfield, N. J., assignor to AMP Incorporated, a corporation of New Jersey Original No. 2,600,012, dated June 10, 1952, Serial No. 717,842, December 23, 1946. Application for reissue January 7, 1958, Serial No. 707,658

9 Claims. (Cl. 339—276)

Matter enclosed in heavy brackets [ ] appears in the original patent but forms no part of this reissue specification; matter printed in italics indicates the additions made by reissue.

This invention relates to a connector or terminal adapted for electrical connections, and to means for and methods of making and applying the same.

In the commercial manufacture of nearly all kinds of electrical apparatus and wiring circuits, the ends of the wires or other conductors have to be electrically connected. This is ordinarily accomplished by securing these ends with a clamping means, e. g., a bolt-and-nut binding post, by soldering, or by so-called "solderless" connectors compressed or "crimped" onto the wire. Because of demonstrated deficiences of clamped and soldered connections and the demonstrated high efficiency and reliability of the crimped connections they are preferred for all quality work.

It is among the objects of this invention to provide a practical and efficient terminal connection which may be economically made. It is also an object to provide an electrical connector or terminal which will afford an excellent electrical contact and maintain that contact despite any adverse physical or corrosive conditions to which it may be subjected. A further object is to provide a connection for a wire or cable which will have high resistance to pull out and good tensile strength. Another object is the provision of improved methods for application of a terminal and formation of a connection such as above described. Other objects will be in part apparent and in part pointed out hereinafter.

In this specification and the accompanying drawings, I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms each as may be best suited to the conditions of a particular use.

Figure 1:
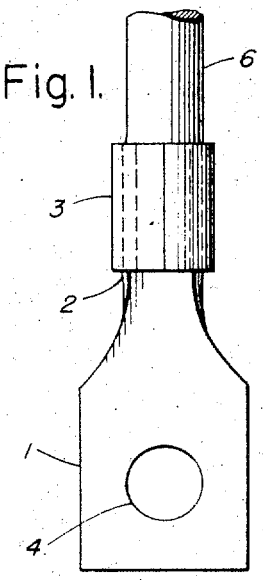
Figure 1 is a top plan view of an electrical terminal embodying features of my invention, the terminal being positioned on the bared end of a wire preparatory to crimping.
Figure 3:
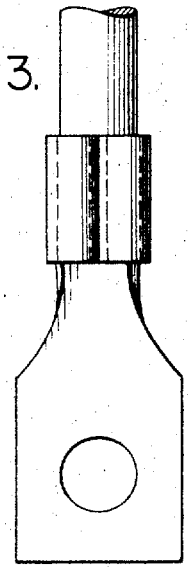
Figure 3 is a top plan view of such a terminal after crimping on the wire.
Figure 5:
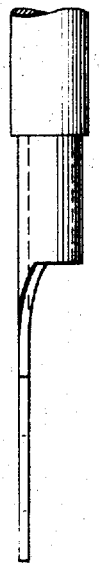
Figure 5 is a side view of the terminal shown in Figures 1, 2 and 3 after crimping.

This invention contemplates particularly the use of a stranded wire, although it is useful also with other types of wire and other forms of conductors. The terminal of the invention has a ferrule forming portion which, in the crimping operation, penetrates, or is pressed into, the wire or cable. The terminal connectors used in the practice of the invention may be stamped from sheet metal, e. g., to a shape such as that shown in Figure 8, in which the tongue portion 1 represents any of a wide variety of connector forms.

From this tongue the connector tapers at one end into a neck 2, which in turn joins a ferrule portion 3 comprising a central or root portion 3a and a pair of opposed laterally extending portions 3b and 3c of generally rectangular shape. Quarter-hard to half-hard brass or copper or other metal having a hardness of about the same order has been found best. Copper plated soft steel has been found very good. These blanks may be stamped separately, or may be joined in a continuous strip either end-to-end (as indicated by broken lines in Figure 9) or side-to-side (as indicated by broken lines in Figure 8).

Figure 2:
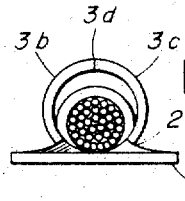
Figure 2 is an end view of the terminal shown in Figure 1.

As shown in Figures 1 and 2, ferrules 3 are formed by bending or "rolling" the ferrule portion to form an approximately cylindrical barrel along the uppermost line of which the ends of ears 3b and 3c meet in a butt joint 3d.

If the wire to which the terminal is to be applied is insulated, the insulation may be removed from the end thereof for a distance slightly in excess of the length of ferrule 3. This bare length is then inserted into ferrule 3 so that the end of the conductor is positioned near the inner edge of ferrule 3 and the insulation terminates just short of the outer edge of ferrule 3, as shown in Figure 1.

Note, in Figures 1 and 2, that the uncrimped ferrule has an inside diameter which is between one and one-half and two times the diameter of the stranded wire upon which it is designed to be used. Such a ratio of diameters, however, is not essential to the invention in its broadest aspect. Greater diameter can be used with progressively inferior results; and lesser diameter can be used down to that at which it is so nearly the same as that of the wire as to make difficult insertion of the wire. It is an important advantage of the present invention, as well as of the broader invention disclosed in my copending application Serial No. 679,630 filed June 27, 1946, now Patent No. 2,557,126, issued June 27, 1951, that it does thus accommodate different wire sizes, so that the inventory of different terminal sizes and different crimping tools required for various uses is greatly reduced, and also the danger of an inferior connection resulting from selection of the wrong size terminal or dies or from accidental removal of strands when stripping insulation, are substantially eliminated. With inside diameters of the ferrule between one and one-half or even twice the outside diameter of the wire cable and that of the cable itself, the length of the ears 3b and 3c is most advantageous for forming the ferrule and engaging with the wire strands as hereinafter described.

Figure 6:
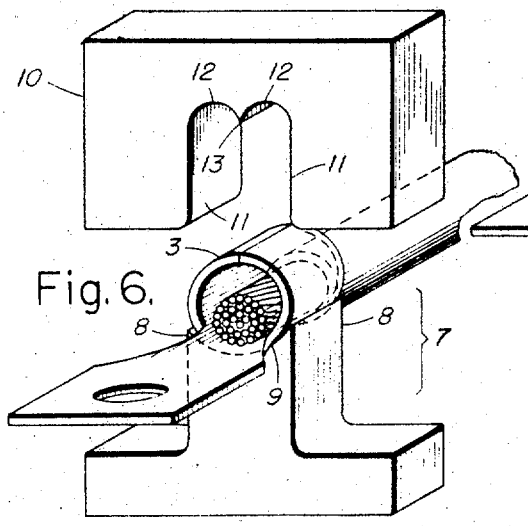
Figure 6 is a perspective view of such a terminal and wire in position ready for crimping in crimping dies.

The terminal and wire thus assembled are pressed between a pair of crimping dies of the type shown in Figure 6. One of these dies 7, here shown as the male die, comprising an upstanding rectangular column or post 8, has a die face 9 which is shaped to the desired bottom form of the crimped terminal (concave as shown, to form a cylindriform bottom of the central root portion, but it may be of other form, e. g., flat or V-shaped, ridged or W-shaped). The length of the die may be equal to or greater, or even slightly less, than the length of ferrule 3; but advantageously it leaves outside of the dies a substantial portion of the ferrule at its end toward the wire. This provides a "funnel" mouth for the crimped ferrule which gives better fatigue strength in the crimped connection. The die face 9, as shown, is contoured to present an approximate fit to the base of ferrule 3, with the sides of column 8 approximately tangential to the circumference of the ferrule 3. The other die 10 comprises a block having a recess formed with side-walls 11 spaced to receive the column 8 when the dies are in closed position (see Figure 7); and the end of this recess, being of a W form with smoothly rounded bottoms, advantageously is formed by a pair of parallel cylindriform troughs 12 each of which is tangential to one of the side walls 11 and which unite to form a sharp cusp or ridge 13 along the center line of the recess.

Dies 7 and 10 may be mounted in a standard press, or may form the opposite jaws of a pliers-like hand tool.

Figure 11:
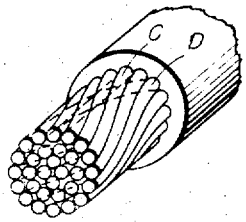
Figure 11 is a modified perspective view of the bared end of an insulated wire of a type which may be used in the practice of this invention, with the outer layer of strands at the bottom of the wire only being indicated by broken lines.
Figure 12:
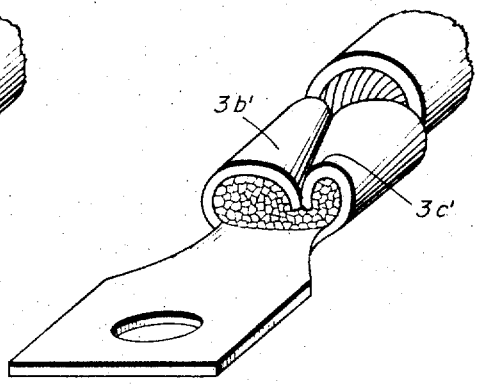
Figure 12 is a perspective view of a terminal similar to that shown in Figure 10, which has been crimped by a method within the scope of my invention.

As the dies are closed on the terminal, the bottom or root portion of the ferrule 3 is supported on the face 9 with its butt joint 3d facing ridge 13. As the dies are closed ridge 13 turns inwardly the abutting ends of ears 3b and 3c; and as ridge 13 continues to move downwardly, ears 3b and 3c are bent until they conform to the contours of troughs 12. Past this point, as upper die 10 continues downwardly, ears 3b and 3c are pushed around troughs 12 and the butt ends of the ears are driven side-by-side downwardly past ridge 13 into the wire. If the strands of the conductive core are spirally twisted, as shown in Figure 11, the ends of the ears, which will strike the core in the area indicated by dotted lines C, will cut across the directions of the strands, and thus contact many strands of the wire. If the pitch of the spiralling of the strands is relatively short—i. e., if the degree of twisting of the strands is great—the strands first contacted by the ends of the ears will be forced downwardly through the bundle of strands, and the remaining strands will be forced aside and upwardly into those parts of the ferrule which bear against troughs 12. This rearrangement of the relative positions of the strands and deformation of the shape of the wire creates a connection having excellent pull-out strength. Also, since the ends of the ears cut across the strands, each ear is in direct electrical contact with a large number of strands—a condition which contributes to the maintenance of constant electrical resistance in the connection. To prevent cutting of the strands by the ends of the ears in this type of crimping, the metal of which the terminal is formed may be softer than that of the strands; although I have also had excellent results using harder metals. Also, the ratio of the diameter of the ferrule to that of the core should be such that the ends 3b and 3c are not driven through the wire to the base 3a of the ferrule, but merely provides proper depth of penetration of the ears into the wire.

If the strands of the conductive core and not twisted, or are twisted only slightly, the ends of the ears may pass between the strands, parting them into two bundles of approximately equal size. The strands adjacent the ferrule will be in contact with the ferrule throughout its length. As the ears of the ferrule penetrate the core, they wipe clean the adjacent strands, enhancing the effectiveness of electrical contact therewith.

Figure 4:
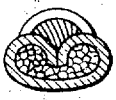
Figure 4 is a cross-sectional view of a crimped terminal similar to that shown in Figures 3, 5 and 7, but having ears with swedged or beveled ends.

In curling, the ears are compressed on the inside with or without stretching the outside, which causes their edges to be rounded back on the outside and pushed forward on the inside, sharpening the edges (as shown particularly in Figure 7) and allowing them more readily to part the strands and penetrate the bundle. There is some advantage in sharpening the outer edge, e. g., by swedging the edge of the blank before it is rolled up to the cylindrical form. This is shown in Figure 4.

Since the parallel strands are at first quite readily displaced, less force is required initially for this type of crimp than for that wherein the ends of the ears cut across the direction of the strands. Thus a greater length of the ears may pass around the curling dies 12 before they bind under pressure and stop sliding. As the die moves down, however, the strands are crowded against and under the ears 3b, 3c, until further penetration stops and final movement of the die may be accommodated by plastic flow of the metal of the ears 3b, 3c, under edgewise compression.

Figure 8:
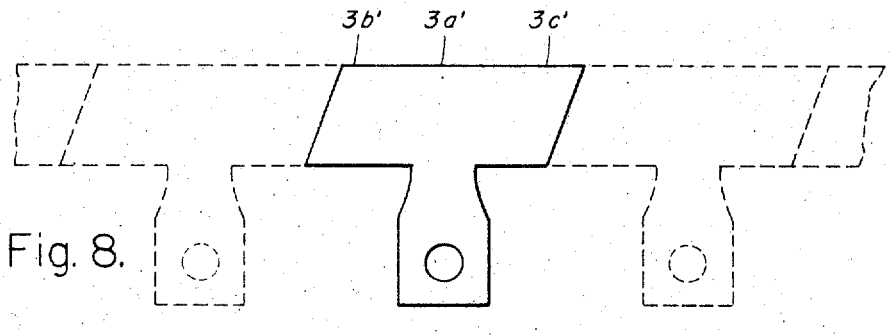
Figure 8 is a plan view of such an electrical terminal before shaping of the ferrule thereof.
Figure 9:
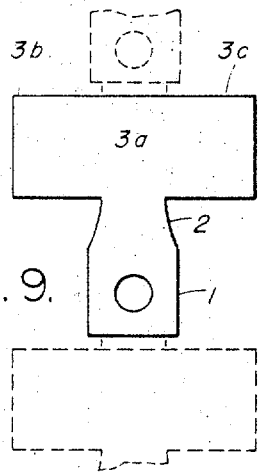
Figure 9 is a plan view of another type of electrical terminal embodying features of my invention before shaping of the ferrule of the terminal.
Figure 10:
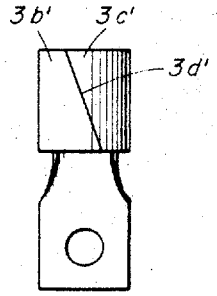
Figure 10 is a top plan view of an electrical terminal of the type shown in Figure 8 after shaping of the ferrule thereof.

Even where the strands are tightly twisted, the ends of the ears may be caused to enter the core parallel to the strands by use of a terminal of the type shown in Figures 8 and 10. This terminal comprises a tongue 1, neck 2, and base 3a of similar form as in the embodiment hereinbefore described. In the present terminal, however, the ears 3b' and 3c' at either side of base 3a have slanted ends, which, when the ears are rolled to form the ferrule, unite in a butt joint 3d' diagonally across the top thereof.

Such a terminal may be crimped between dies similar to those shown in Figure 6, except that the ridge 13 in the upper die, instead of being parallel to the side-walls 11 of the recess, is skewed to the same degree as the butt joint of the terminal, so that when the upper die is closed on the ferrule of the terminal, the ridge contacts the ferrule along the diagonal joint; the edges of the ears strike the core parallel to its strands and enter between them. However, after the edges of the ears have passed half way through the core, the lay of the strands is at the opposite angle (as shown by broken lines in Figure 11) so that the ears strike across the strands in the lower half of the wire, each ear directly contacting a large number of strands and pushing against them to give a pressure contact, as previously described. This type of crimp thus has the combined advantages of low crimping force requirement, large contact area, high pull-out strength and low contact resistance.

In certain applications it may be desirable to skew the butt joint of the ferrule (and the ridge of the die) in the opposite direction—i. e., contrary to the grain of the strands, as indicated by dotted lines D in Figure 11, to produce exclusively that type of action wherein the uppermost strands are forced through the bundle and the lower strands are displaced aside and upwardly. Or, where such action is desired with a wire wherein the strands are untwisted, the butt joint and the ridge may be skewed in either direction.

If, in any of the above types of crimp, the upper die is slightly shorter than the ferrule, and the die is centered on the ferrule, the ends of the crimped ferrule will be flared. Such a flaring at the inner end of the ferrule provides a funnel or bell mouth which enhances the pull-out strength of the connection, especially against fatigue. The "bell mouth" at the outer end of the ferrule gives a smoothly and gradually curved lip against which the wire may swivel when flexed, materially reducing the danger of breakage at this most vulnerable point.

Figure 13:
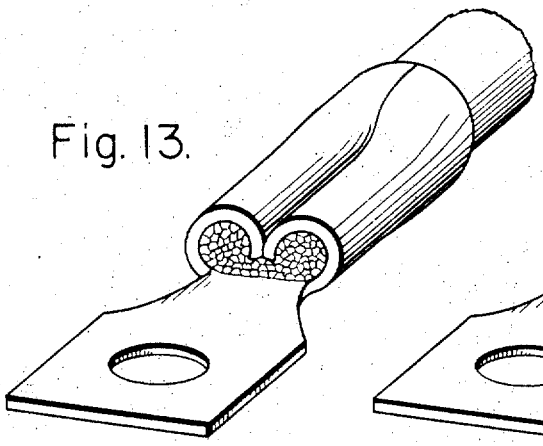
Figure 13 is a perspective view of a terminal similar to that shown in Figure 1 but with a ferrule of slightly greater diameter and length, which has been mounted and crimped according to my invention.

Additional reinforcement may be provided by mounting the terminal so that the outer end of the ferrule encloses the end of the insulation, as shown in Figure 13. The terminal may be uncrimped in that portion over the insulation or it may be crimped with a larger die of similar design which grips without cutting or unduly weakening the insulation. Preferably the inside diameter of the ferrule should just exceed the diameter of the insulation, and the ferrule may be longer than in the models hereinbefore describd. The construction of the ferrule near the crimped portion grips the ends of the insulation and provides a rugged assembly. An additional benefit is that the connection is enclosed at one end by the seal between the ferrule and insulation and thus more completely shielded from corrosion.

Figure 18:
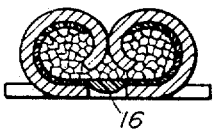
Figure 18 is a cross-sectional view of a terminal of the type shown in Figures 14, 16 and 17, mounted and crimped in a different method within the scope of my invention.

It is also possible to apply such a terminal onto unstripped insulated wire; the ends of the ears 3b and 3c being driven down through the insulation into contact with the wire. For best results, however, an opening should be provided (e. g., by punching out a hole in the root 3a as shown in Figure 18) to allow extrusion of the insulation to relieve local pressure, in the same manner as with the gap left in the ferrule described in my said copending application, wherein this feature is more particularly claimed.

Figure 14:
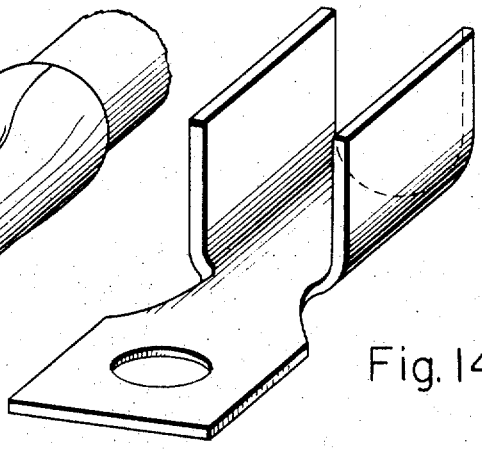
Figure 14 is a perspective view of another type of terminal connector embodying features of my invention.

In Figure 14 is shown an electrical terminal similar to that shown in Figures 1 and 2, except that the ears of the ferrule, instead of being rolled into a closed cylinder, are bent upwardly to form a U-shaped trough. When a terminal of such shape is crimped in dies of the form shown in Figures 6 and 7, the resulting action is different from that previously described. As the ends of the U'd up ears 3b'' and 3c'' contact the curved surfaces of troughs 12 in the upper die, they are bent inwardly. This is preferably a gradual curling of the ears—a bending which commences with the edges and progresses down the ears toward their root; at first it may be, however, a cantilevering of the ears—a bending near the root of the ears with the upper portions of the ears being slanted inwardly without bending. Even though the action is of the latter type at first, a point is reached where the ends of the ears either strike each other as each clears ridge 13, or where each ear is driven perpendicularly into the inner surface of its trough 12 near ridge 13; when this happens, the ears, though previously unbent throughout their upper portions, are then driven into conformity with the contours of troughs 12.

Figure 15:
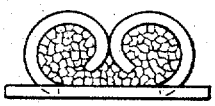
Figure 15 is a view of a vertical section through the ferrule of a mounted and crimped terminal of the type shown in Figures 14, 16 and 17.

As the upper die continues downwardly, the ears curl and are pushed around through the troughs and their edges move past ridge 13 into the wire. Inside the wire, the edges of the ears do not continue downwardly together, as previously described, but, since each ear has been curled throughout its length, the edges move in tangential arcuate courses. The crimped ferrule as shown in Figure 15, thus tends to divide the strands of the wire into three bundles of approximately equal size, a bundle in the grip of each of the two curled ears and a third bundle wedged beneath their divergent ends. Since the ears can penetrate the wire through a considerable distance, and since both sides of each ear are in contact with the strands this type of connection has a very large area of contact. An additional advantage of the U'd up ferrule is that the wire may be inserted into the open top thereof with greater ease than that with which a wire can be threaded into a closed ferrule. The wire need not be pushed into the terminal at all; if it is inserted into the recess of the female die 10, it will be gathered in by the ears 3b, 3c as they scrape the sides 11 and the troughs 12.

Figure 7:
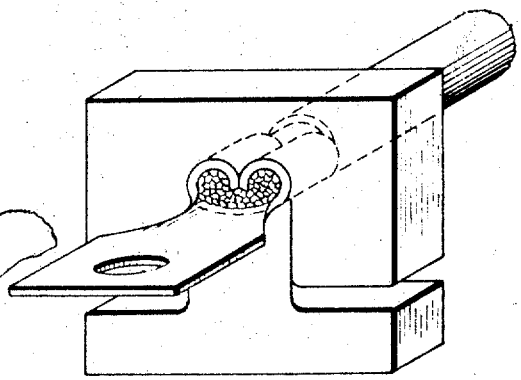
Figure 7 is a perspective view of the crimping dies closed on the crimped terminal.
Figure 16:
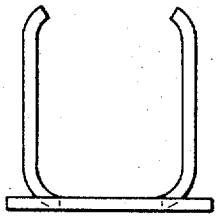
Figure 16 is a perspective view of a terminal similar to that of Figure 14, but having ears of modified shape.

Figure 16 illustrates a modification which may be effected in a terminal of the type shown in Figure 14. As will be seen, the ends of the ears are bent inwardly for a short distance, to a radius of curvature approximately equal to that of troughs 12. This pre-forming of the ears gives them a tendency to curl continuously around the troughs, bending progressively back from their edges. The rounded upper exterior of the upstanding ears also facilitates entry of these ears into the upper die; and if the troughs 12 are provided on the male die 8 instead of the female as shown, this pre-curling prevents the ends from catching on the sharp edges of the male die. Such prebending of the ears is particularly desirable when one wishes to form a three bundle crimp such as is shown in Figures 15 and 18, as distinguished from the straight penetration crimp as shown in Figures 4, 7 and 13.

Figure 17:
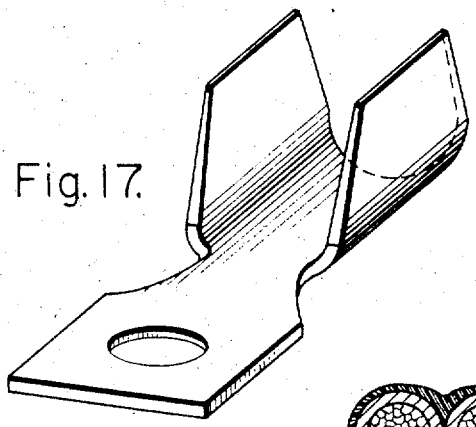
Figure 17 is a perspective view of a terminal also similar to that of Figure 14, but having ears of yet a different shape.

Another modification of this type of terminal is illustrated in Figure 17. In this version, the ears of the ferrule are tapered in length from the roots toward the ends to give each ear a trapezoidal shape. Also the ears are tapered in thickness toward their ends. The shorter, thinner portions of the ear near the end have a lessened resistance to bending, so that the ear bends progressively back from the end. This effect may be produced to a lesser degree by either one of the two forms of tapering without the other. These features also are more particularly described and claimed in my said copending application.

In said prior application the ears were staggered narrower prongs so that each could extend beyond an axial plane when curled into the wire and give, when crimped, a zig-zag clamping like that between interlaced fingers of one's two hands when curled around a pencil, or a wire. As shown in Figure 17 the trapezoidal ears are broad, identical in shape and opposite because each is to be curled into the wire along an axial plane. Even the narrower staggered ears, as shown in my copending application, however, may be used with the dies shown in this application so that all the ears curl into the wire approximately along the same axial plane. This has been found to give a very excellent and stable connection. A further difference of importance between the crimp with overlapping ears as shown in my said copending application and the crimp formed as here shown and described is that the longer radius curl of the overlapping ears can be made with less surface pressure between the die face and the ear, so that the ear is more readily pushed around the curling die and into the wire, giving a longer curl; whereas with the short radius curl of the dies as here shown the back pressure which is developed soon after penetration of the ear into the wire creates such resistance against the die that the ear ceases to feed across it into the wire and further closing of the dies, therefore, results in edgewise compression of the metal of the ferrule, first giving engagement with the wire and relieving stresses by plastic flow and eventually extruding the ferrule to a greater length.

Figure 18 illustrates a terminal of the type shown in Figure 14 which has been applied to an unstripped, insulated wire. As shown, the ends of the ears pierce the insulation 16 and enter the conductive core of the wire. The sharpening of the edges of the ears in curling, as previously described, enables the edges to cut the insulation more easily. The ears cut the insulation best when they strike it at an angle approximately normal to its surface. With terminals of the cylindrical ferrule type, this optimum cutting angle is inherent in the crimping action, since the ends of the ears move downwardly in an approximately straight-line path.

With the U'd up ferrule, however, since the ends of the ears follow approximately circular paths, the length of the ears must be properly chosen to assure that their ends contact the insulation at the instant when the motion of the ends is vertically downward, without a lateral component—that is, at approximately the same instant that the ends of the ears meet below ridge 13. If the ears are too long, their ends will have commenced to curl outwardly before striking the insulation; they thus strike the insulation at a lower angle and may even be deflected without piercing.

Although the insulation separates much of the ferrule from the wire, giving this form of connection a lesser area of contact than that where the insulation ts stripped from the end of the wire, adequate contact is made with the parts of ears 3b, 3c which penetrate through the insulation. The hole 16 provides for relieving excessive crimping pressure, as already mentioned above. Since the time and cost for stripping insulation, even with a stripping tool, may equal or exceed those of all other steps of applying the terminal, the advantage of such a terminal for application onto an insulated wire is clear. Also, in stripping insulation, it is difficult to avoid cutting too deeply and severing or weakening strands of the wire, a danger which is avoided by use of this type of crimp.

If the insulation is too tough to be readily pierced by the ends of ears 3b, 3c, one may cut a longitudinal slit in the insulation from the end thereof for a distance approximately equal to or slightly less than the length of the ferrule. Making such a slit is a much simpler operation than stripping insulation and the danger of cutting strands is substantially eliminated. If the wire is so oriented in the ferrule that this slit is at the top of the wire, the ends of the ears may easily enter the core of the wire. The slit may be made after insertion of the wire into the ferrule by means of a knife edge on, or moved down through, the ridge 13 between the abutting edges of the ears 3b, 3c.

This is more particularly described and claimed in a copending application of Franklin H. Wells, Serial No. 781,826, filed October 24, 1947.

Figure 19:
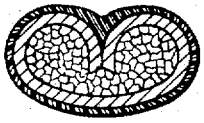
Figure 19 is a cross-sectional view of a crimped pre-insulated terminal.

In Figure 19 is shown a terminal, provided with a sleeve or stiff plastic insulation which is mounted before crimping in accordance with the invention disclosed and claimed in the application of William S. Watts, Serial No. 514,216, filed December 14, 1943, now Patent 2,410,321, issued October 29, 1946. The terminal as shown may be identical with that of Figures 1–7 and 9 except for the addition of the insulating sleeve onto the ferrule 3. The resulting terminal is crimped onto the wire in exactly the same manner as shown in Figures 6 and 7 except that the die sizes are slightly larger to accommodate the thickness of the insulation. With some types of insulation it is well to hone off the sharp edge of the ridge 13 to give it a a slight radius or dullness.

When the die comes down against the ferrule the force exerted by the ridge 13 is transmitted through the plastic and the ferrule buckles in at the butt joint 3d. Thus the edges of the ferrule are driven into the wire. The plastic sleeve 18 being seamless is not broken when it is buckled in and therefore continues to afford complete insulation to the terminal. If the insulating sleeve extends beyond the terminal to support the insulated part of the wire, it may be crimped in the same type (but larger) die or any other appropriate type of crimping may be used to bring the supporting portion of the sleeve into gripping engagement with the insulation on the wire.

There are thus seen to be provided several modifications of an electrical terminal and several variations in the methods of attachment thereof, each of which has advantages which will commend it for applications of different requirements. Certain advantages are, however, common to all of the modifications herein shown and described. For example, each of these terminals, when crimped in place on the wire, completely encloses and seals the periphery of the conductive core. This gives to the connection a good resistance to corrosion.

In crimping these terminals, after the ears of the ferrule have reached their ultimate position, the dies may be given a final additional compression. This will cause deformation not only of the wire as a whole, but of each strand therein—molding them to fill the interstices and forming a more solid metallic cross-section.

All of the terminals shown have the additional advantage that any tendency of one of the ears of the ferrule to unroll or spring back is resisted by a similar tendency of the opposite ear. The two ears thus cooperate to maintain a permanent crimp.

I claim:

1. An electrical connection comprising a connector including a ferrule and a stranded conductor extending into said ferrule, one portion of the ferrule surrounding the conductor with integral ears extending from opposite sides thereof curled together face-to-face to close the ferrule and therebeyond within the ferrule forming oppositely directed curls, at least a portion of the strands of said conductor being engaged between the bight between said opposite curls and the bottom of the ferrule.

2. An electrical connection comprising a connector including a ferrule and a stranded conductor extending into said ferrule, one portion of the ferrule surrounding the conductor with integral ears extending from opposite sides thereof curled together face-to-face to close the ferrule and therebeyond within the ferrule forming oppositely directed curls, at least a portion of the strands of said conductor being engaged between the bight between said opposite curls and the bottom of the ferrule and another portion of said strands being engaged in each of said curls.

3. An electrical connection comprising a connector including a ferrule having a stranded conductor therein, one portion of the ferrule surrounding the conductor with integral ears extending from opposite sides thereof curled together face to face to close the ferrule longitudinally, the ends of said ears being spaced from the inner surface of the ferrule of which they form a part and bearing against strands of the conductor surrounded by the ferrule, *the strands of the conductor and the ferrule being deformed substantially to fill the interstices thereof.*

4. An electrical connection as defined in claim 3 in which the face to face contact of the ears which closes the ferrule longitudinally is in a line at an acute angle to the axis of the conductor.

5. An electrical connection as defined in claim 3 in which the face to face contact of the ears which closes the ferrule longitudinally is in a line substantially parallel to the long axis of the conductor.

6. The method of making an electrical connection which comprises inserting a multi-strand conductor in a tubular ferrule having a longitudinal seam and an inside diameter which is between one and one-half and two times the external diameter of the conductor, simultaneously inwardly curling the portions of the ferrule on both sides of the seam until the respective outer surfaces of those portions adjacent the edges which defined the seam are in tangential contact to define a seam extending longitudinally of the ferrule while maintaining an appreciable space between the conductor and ferrule in zones on both sides of said seam and thereafter compressing said portions and the remainder of the ferrule to cause the ends of said portions as well as the inner surfaces of the ferrule tightly to engage the conductor.

7. The method of making an electrical connection which comprises inserting a multi-strand conductor in a trough-like ferrule portion of a sheet metal blank having integral ears projecting upwardly in registry on directly opposite sides of the trough-like ferrule portion, simultaneously curling both ears inwardly along an arcuate path until the respective outer surfaces of the ears adjacent the edges are in tangential contact to define a seam extending longitudinally of the ferrule while maintaining an appreciable space between the conductor and ferrule in zones on both sides of said seam and thereafter compressing the ears, the ferrule portion and the conductor to cause *extrusion of metal of the connection thus formed axially of the conductor length, and to cause* the ends of the ears as well as the inner surface of the ferrule portion and ears tightly to engage the conductor, *the compression deforming the strands of the conductor and the ferrule substantially to fill the interstices thereof.*

*8. An electrical connection comprising a connector including a ferrule having a stranded conductor therein, one portion of the ferrule surrounding the conductor with integral ears extending from opposite sides thereof curled together face to face to close the ferrule longitudinally thus to preclude the escape of strands of the conductor from within the ferrule, the ends of said ears being spaced from the inner surface of the ferrule of which they form a part and bearing against strands of the conductor surrounded by the ferrule, the strands of the conductor and the ferrule within said portion being deformed substantially to fill the interstices thereof, the cross-sectional area of metal within said portion being less than that of the conductor and ferrule without said portion.*

*9. The method of making an electrical connection which comprises inserting a multi-strand conductor in a trough-like ferrule portion of a sheet metal blank having integral ears projecting upwardly in registry on directly opposite sides of the trough-like ferrule portion, simultaneously curling both ears inwardly along an arcuate path until the respective outer surfaces of the ears adjacent the edges are in tangential contact to define a seam extending longitudinally of the ferrule while maintaining an appreciable space between the conductor and ferrule in zones on both sides of said seam and thereafter compressing the ears, the ferrule portion and the conductor to cause the ends of the ears as well as the inner surface of the ferrule portion and ears tightly to engage the conductor, the compression deforming the strands of the conductor and the ferrule to fill the interstices thereof.*

References Cited in the file of this patent or the original patent

UNITED STATES PATENTS

| | | |
|---|---|---|
| 308,087 | McDonald | Nov. 18, 1884 |
| 1,158,930 | Klingner | Nov. 2, 1915 |
| 1,657,208 | Greaves | Jan. 24, 1928 |
| 1,816,674 | Fortner | July 28, 1931 |
| 1,827,337 | Schwartz | Oct. 13, 1931 |
| 1,937,431 | Mendell | Nov. 28, 1933 |
| 1,944,251 | Mansbendel | Jan. 23, 1934 |
| 1,955,695 | Veiling | Apr. 17, 1934 |
| 1,959,150 | Basch et al. | May 15, 1934 |
| 2,109,073 | Nieman | Feb. 22, 1938 |
| 2,109,837 | Davis | Mar. 1, 1938 |
| 2,149,209 | Dickie et al. | Feb. 28, 1939 |
| 2,165,323 | White | July 11, 1939 |
| 2,302,767 | Hackbrath | Nov. 24, 1942 |
| 2,374,413 | Carlson | Apr. 24, 1945 |
| 2,379,567 | Buchanan | July 3, 1945 |
| 2,466,607 | Matthysse | Apr. 5, 1949 |

FOREIGN PATENTS

| | | |
|---|---|---|
| 66,983 | Austria | May 1, 1914 |